United States Patent [19]

Tobelmann et al.

[11] Patent Number: 4,777,053
[45] Date of Patent: Oct. 11, 1988

[54] MICROWAVE HEATING PACKAGE

[75] Inventors: David W. Tobelmann; Michael L. Troedel, both of Plymouth; Robert L. Esse, Monticello, all of Minn.

[73] Assignee: General Mills, Inc., Minneapolis, Minn.

[21] Appl. No.: 869,473

[22] Filed: Jun. 2, 1986

[51] Int. Cl.⁴ .......................................... B65D 81/34
[52] U.S. Cl. ............................. 426/107; 426/113; 426/124; 426/234; 426/126; 219/10.55 E; 229/3.5 MF
[58] Field of Search ............... 426/107, 234, 243, 113, 426/126, 127, 124; 219/10.55 E

[56] References Cited

U.S. PATENT DOCUMENTS

| | | | |
|---|---|---|---|
| 2,600,566 | 6/1952 | Moffett | 426/107 |
| 2,714,070 | 7/1955 | Welch | 426/107 |
| 2,830,162 | 4/1958 | Copson et al. | 426/107 |
| 3,117,875 | 1/1964 | Burns et al. | 426/113 |
| 3,240,610 | 3/1966 | Cease | 426/113 |
| 3,271,169 | 9/1966 | Baker et al. | 426/114 |
| 3,302,632 | 2/1967 | Fichtner | 426/113 |
| 3,865,301 | 2/1975 | Pothier et al. | 426/107 |
| 3,941,967 | 3/1976 | Sumi et al. | 426/107 |
| 3,985,990 | 10/1976 | Levinson | 426/243 |
| 4,015,085 | 3/1977 | Woods | 426/107 |
| 4,081,646 | 3/1978 | Goltsos | 426/107 |
| 4,122,234 | 10/1978 | Falk | 426/241 |
| 4,190,757 | 2/1980 | Turpin et al. | 426/107 |
| 4,204,105 | 5/1980 | Leveckis et al. | 426/107 |
| 4,230,924 | 10/1980 | Brastad et al. | 426/107 |
| 4,258,086 | 3/1981 | Beall | 426/107 |
| 4,266,108 | 5/1981 | Anderson et al. | 426/107 |
| 4,267,420 | 5/1981 | Brastad | 426/107 |
| 4,279,374 | 7/1981 | Webinger | 426/113 |
| 4,283,427 | 8/1981 | Winters et al. | 426/107 |
| 4,306,133 | 12/1981 | Levinson | 426/107 |
| 4,345,133 | 8/1982 | Cherney et al. | 426/107 |
| 4,351,997 | 9/1982 | Mattisson et al. | 426/107 |
| 4,390,554 | 6/1983 | Levinson | 426/113 |
| 4,398,077 | 8/1983 | Freedman | 426/243 |
| 4,416,906 | 11/1983 | Watkins | 426/113 |
| 4,486,640 | 12/1984 | Bowen | 426/243 |
| 4,518,651 | 5/1985 | Wolfe | 426/107 |
| 4,542,271 | 9/1985 | Tanonis et al. | 426/107 |
| 4,553,010 | 11/1985 | Bohrer et al. | 426/107 |
| 4,555,605 | 11/1985 | Brown et al. | 426/107 |
| 4,590,349 | 5/1986 | Brown et al. | 426/113 |
| 4,592,914 | 6/1986 | Kuchenbecker | 426/113 |
| 4,594,492 | 6/1986 | Maroszek | 426/113 |
| 4,626,641 | 12/1986 | Brown | 426/107 |
| 4,642,434 | 2/1987 | Cox et al. | 426/107 |

FOREIGN PATENT DOCUMENTS

| | | | |
|---|---|---|---|
| 2239211 | 7/1974 | France | 426/107 |
| 1593523 | 7/1981 | United Kingdom | 426/234 |

Primary Examiner—Steven Weinstein
Attorney, Agent, or Firm—John A. O'Toole

[57] ABSTRACT

Disclosed are packaged frozen food articles which are adapted to be heated by microwave. The articles include an overwrapped paperboard carton housing one or more frozen, coated food items. The carton further includes an opposed pair of spaced parallel laminated heating panels. The panels each comprise an inner heating layer mounted on a mounting board, a spacer such as a spaced pair of paperboard sheets with an intermediate corrugated piece, and an outer microwave shield. The heating layer is in direct contact with the food items and can comprise a metallized film. The microwave shield can be a foil such as aluminum foil.

16 Claims, 3 Drawing Sheets

U.S. Patent  Oct. 11, 1988  Sheet 1 of 3  4,777,053
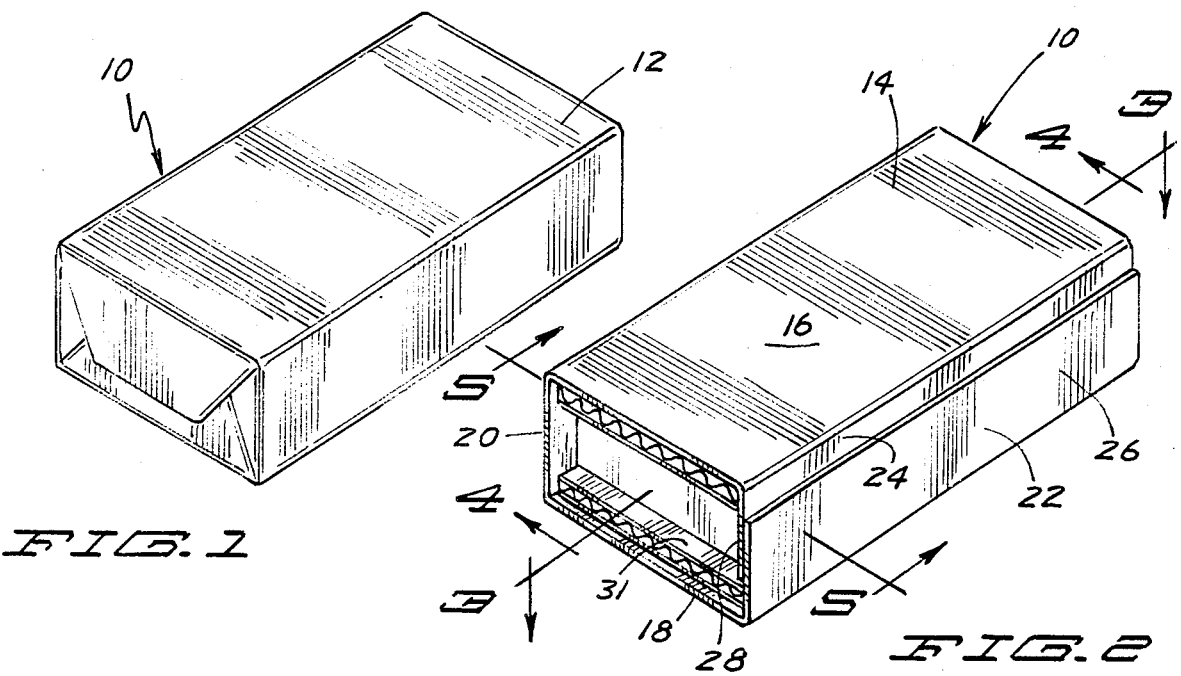
FIG.1
FIG.2
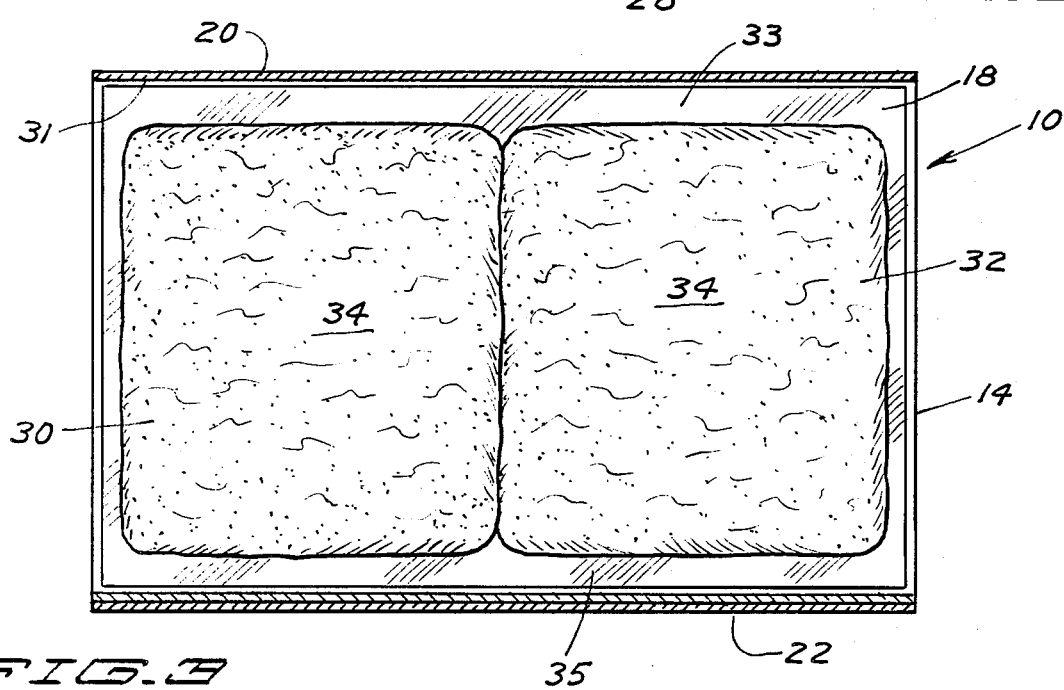
FIG.3
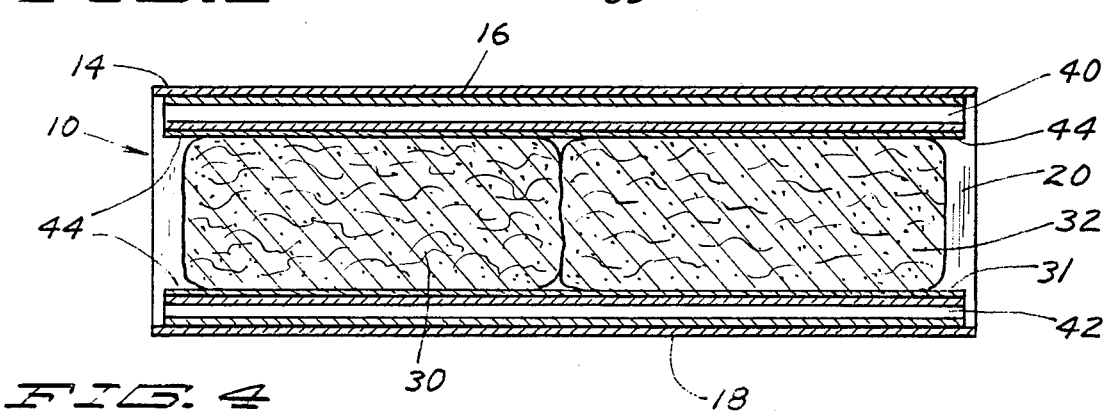
FIG.4

MICROWAVE HEATING PACKAGE

1. THE TECHNICAL FIELD

The present invention relates to food products. More particularly, the present invention relates to packaged or wrapped foods adapted to preparation by microwave heating, especially for coated, fried fish portions.

2. THE PRIOR ART

Battered and breaded frozen food items, e.g., fish, chicken, are popular food items. Upon conventional baking in an oven, the prepared food articles realized exhibit a relative evenness of temperature throughout and a crisp or crunchy coating. During oven heating both oil and water vapor are released and the exterior coating is toasted.

The heating of food articles with microwave energy by consumers has now become commonplace. Such microwave heating provides the advantages of speed and convenience. However, heating breaded food with microwaves often gives them a soggy texture and fails to impart the desirable browning flavor and/or crispness of conventionally oven heated products due in part to retention of oil and moisture.

The prior art includes many attempts to overcome such disadvantages while attempting to retain the advantages of microwave heating. For example, in recent years, ceramic dishes that become hot in a microwave oven have been sold to solve this problem. Such a dish is quite heavy, relatively expensive and must be prewarmed without food on it for about 2 to 5 minutes. A number of other containers that have been proposed for browning or searing the surface of a food fall into three general categories. The first are those which include an electrically resistive film usually about 0.00001 cm to 0.00002 cm thick applied to the surface of a nonconductor such as a ceramic dish and described, for example in U.S. Pat. Nos. 3,853,612; 3,705,054; 3,922,452 and 3,783,220. Heat is produced because of the $I^2R$ loss (resistive loss). While useful, such utensils are not suitable as disposable packages, due to their bulk weight, costs, breakability, etc.

The art also includes as a second category a variety of disposable packages which are adapted for the microwave heating and are successful in varying degrees in providing microwave heated articles with desired organoleptic attributes. Some articles, (see, for example, U.S. Pat. Nos. 4,190,757 and 4,283,427) while useful are both complex and costly and also are specially adapted to heat one type of food, e.g., pizza slices.

Other references are specifically directed toward the third category which includes the packaging for microwave heating of frozen, coated fish portions. U.S. Pat. Nos. 4,267,420 and 4,230,924 each disclose a food item comprising a fish stick wrapped with a plastic film having a thin metal coating or "metallized film." The metallized film is in direct contact with the major surfaces of the fish portion. Part of the microwave energy passes through to heat the food item dielectrically while part is converted to heat by the metallized film to sear the coating in contact therewith. A similar food item is disclosed in U.S. Pat. No. 4,258,086 which discloses an improved metallized film characterized by a protective cover layer over the metal coating and a grid pattern in the metal coating.

The present invention provides further improvements in the provision of packaged food articles adapted to be heated by microwave heating. Generally speaking, the present invention provides an improvement in the ratio of dielectric heating to sear or thermal heating so as to realize heated articles of improved organoleptic attributes. The improvements result from the addition of a spaced microwave deflector. Also, the present invention is superior in allowing oil and water vapor to escape.

Provision of a microwave shield to a packaged article is well known. (See, for example, U.S. Pat. Nos. 4,345,133, 4,204,105 or 4,122,324.) However, while not wishing to be bound by the present theory, it is speculated herein that the present combination of spaced metal foil layers not only serves as a shield but also importantly to deflect and direct the microwave energy to the food being heated.

BRIEF DESCRIPTION OF THE DRAWINGS

FIG. 1 is a perspective view of an embodiment of the present article of a wrapped and packaged food item;

FIG. 2 is a perspective view of the article with the overwrapping removed and thus exposing the food item;

FIG. 3 is an enlarged transverse sectional view of the packaged food item taken in the direction of lines 3—3 of FIG. 2;

FIG. 4 is an enlarged transverse sectional view taken in the direction of lines 4—4 of FIG. 2;

DESCRIPTION OF THE PREFERRED EMBODIMENTS

Figure 5:
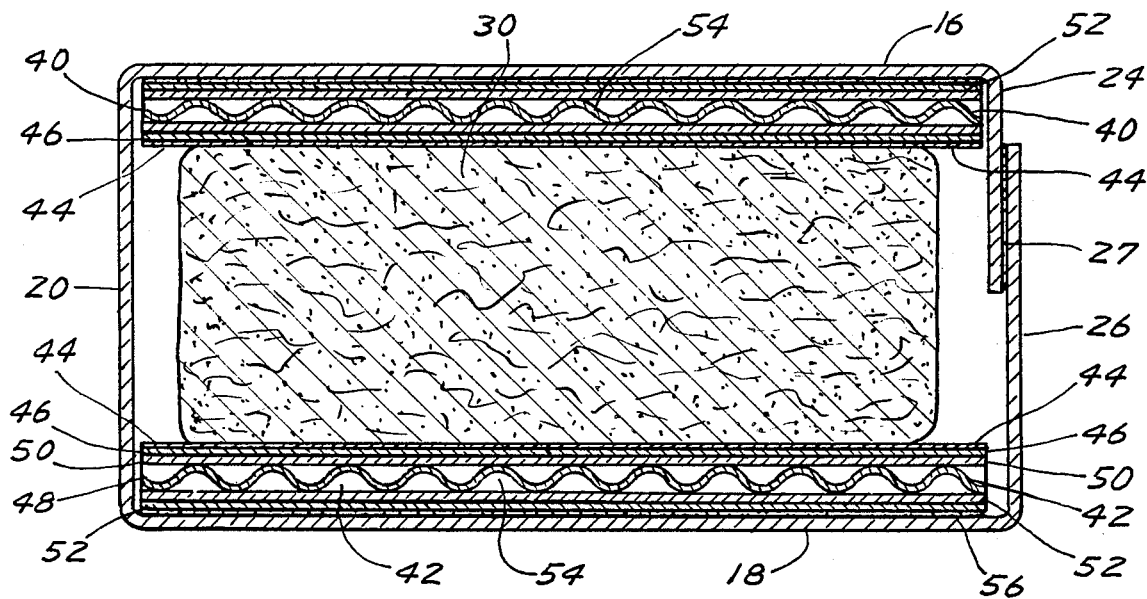
FIG. 5 is a more greatly enlarged cross sectional view taken in the direction of lines 5—5 of FIG. 2.
Figure 6:
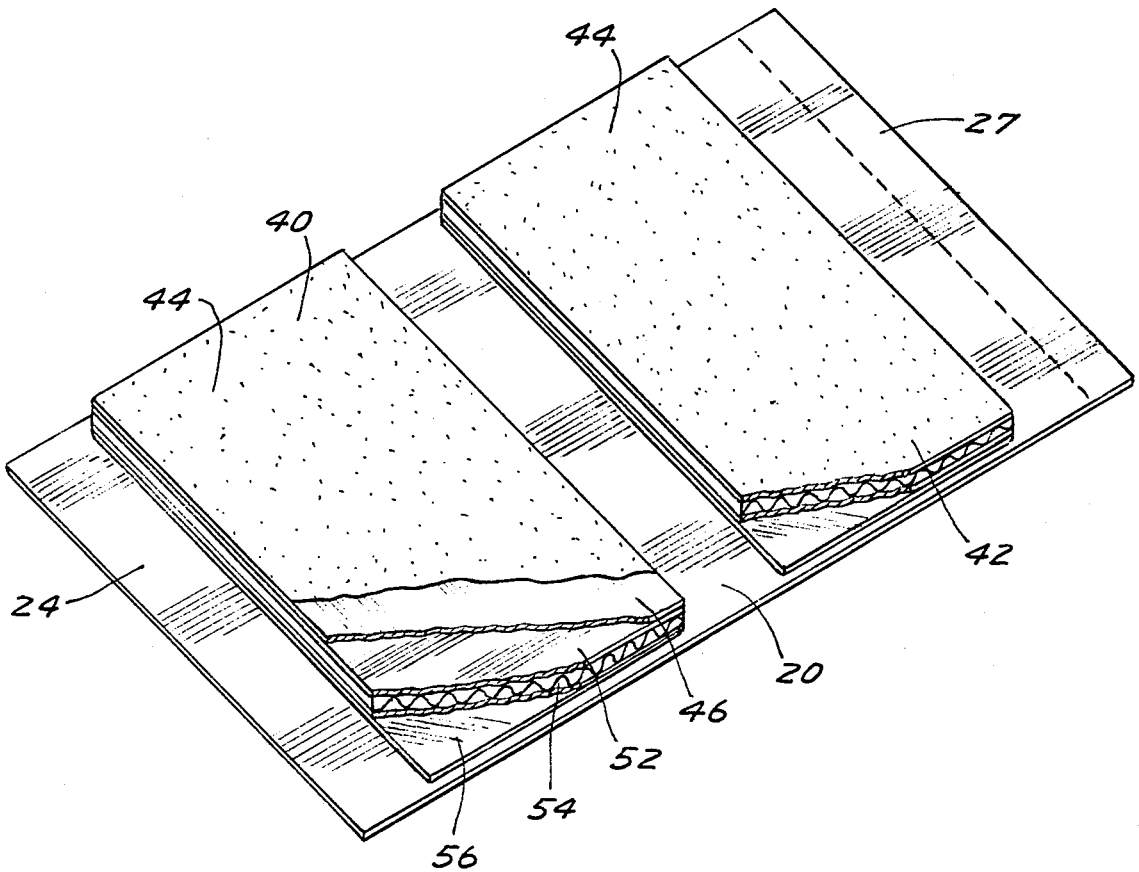
FIG. 6 is a perspective view of the packaging shown in disassembled view depicting the composite laminate panels with their several layers each partially cut away.

Referring now to the drawings and in particular to FIG. 1, there is shown an embodiment of the present food article designated generally by reference numeral 10. The article 10 can be of any conventional shape or size depending upon the size, number and shape of the food items being packaged such as the generally rectangular shape depicted. Of course, several articles 10 may be included into larger packs if desired. The article 10 preferably includes a conventional overwrap or wrapper 12 closely conforming to the shape of a carton described below and substantially surrounding and sealing the article. The material from which the overwarp 12 is fabricated can be any conventional packaging material for frozen foods such as a plastic sheet or thin film of polyester having a thickness of about 0.0005 to 0.001 inch.

In FIG. 2, the outer wrap has been removed as the consumer would normally do to reveal that the article 10 further includes an outer carton 14 having an opposed pair of major or top and bottom surfaces 16 and 18, respectively, as well as an opposed pair of side surfaces including a first or clean side surface 20 and a second side or folded side surface 22 formed by the overlap by end pieces or flaps including an inner end flap 24 and an outer end flap 26 and opposed pair of end openings 28 and 29 (not shown). The carton 14 is importantly fabricated from a microwave transparent, or as sometimes referred to in the art as a "dielectric" material, such as thermoplastic or preferably paperboard because of its low cost. The carton 14 can be conveniently formed from a single folded sheet with any conventional food approved adhesive 27 bonding end flaps 24 and 26 together.

Referring now to FIG. 3, it can be seen that the article 10 further includes and the carton 14 houses one or more food items such as the two food item pieces 30 and 32 depicted in side by side relationship. While the present invention finds particular suitability in connection with frozen coated fish portions and while throughout the specification specific reference is made to pieces 30 and 32 to being fish portions is made, the skilled artisan will appreciate that the present invention can well be used for such other frozen coated or uncoated food items including coated meats, especially chicken, or coated vegetables, e.g., egg plant. The present package also finds use in connection with pizza rolls, potatoes, e.g., hashbrown patties, sausages, corn dogs and the like. Also, while the pieces 30 and 32 are depicted as being generally of rectangular shapes, other shapes whether regular such as oval, wedge, log, circular, or irregular or combinations thereof, can also be employed. The pieces 30 and 32 nest closely to the sides 20 and may or may not be in contact therewith. While not essential, it is preferred to not have the pieces 30 and 32 in contact with sides 20 or 22 of the carton 14 but preferably to have a small air space 33 and 35 so as to aid in venting moisture upon heating. The pieces 30 and 32 each have an opposed pair of generally planar major surfaces such as upper surface 34 and lower surface 36 (not shown).

Referring now briefly to FIG. 4, it can be seen that the article 10 further essentially includes an opposed, spaced pair of upper and lower heating panels 40 and 42, respectively, each of a laminate construction described in detail below. The panels 40 and 42 are mounted within the carton and secured thereto with adhesive means (not shown) so as to form an internal cavity 29. Each panel has a first, inner heating layer or film 44 which is in physical contact with a major surface of the food pieces 30 and 32.

Reference is now made to both FIG.'s. 5 and 6. The panels 40 and 42 as described above each contain a heating layer 44, that is, the innermost layer of film 44 which is a film which heats upon exposure to microwave energy. The film is supported by a support layer or mounting board 46. The panels 40 and 42 further include a spacer member 48 which may be solid, e.g. cellulosic foam or hollow (i.e., air filled) or conveniently may include an opposed pair of spaced parallel sheets of a dielectric material, e.g. carboard 50 and 52 with an intermediate corrugated dielectric material, e.g. cardboard layer 54. The panels 40 and 42 further include a microwave shield layer 56 such as can be provided by a thin layer of aluminum foil.

It can also be seen in FIG. 5 that importantly the heating layers 44 of both upper and lower heating panels 40 and 42 are in direct physical contact with the food pieces 30 and 32. Such contact is maintained by the construction and sizing of the carton 14 to provide holding pressure in view of the size of the food pieces 30 and 32 to be packaged. Such intimate contact is important to the heating and crisping benefits provided by the present invention.

Preferred for use herein as the heating layer 44 are the metallized films described in U.S. Pat. No. 4,267,420 (issued May 12, 1981 to W. A. Brastad) or, less desirably, in U.S. Pat. No. 4,258,086 (issued Mar. 24, 1981 to N. J. Beall) each of which are incorporated herein by reference. These materials are widely known and a variety of suitable materials are available from, for example, the 3M Co. or James River Corp. The wrapping material is preferably comprised of a first plastic sheet or thin film which typically has a thickness of approximately 0.0005 to 0.001 inch. The plastic film 26 can be of polyester.

The wrapping or packaging material further includes a very thin coating on the plastic film, the coating having a surface resistivity of approximately 1 to 300 ohms per square inch, and preferably about 1 to 10 ohms per square inch. It will be understood that a resistivity of 1 ohm per square denotes a heavier or thicker coating than a coating of the same material having a 10 ohms per square resistivity. The greater the resistivity, the more microwave energy which is converted to heat. The practical upper limit to the resistivity is determined by the scorch temperature of the mounting board 46 and the plate separation as described below.

It will be appreciated that the specific resistance of a coating is susceptible to variation and that within limits the thicker such coating is the less pervious or more opaque it is to the passage of microwave energy therethrough. Hence, in order to promote a greater degree of browning, the coating would be thicker than when a lesser degree of browning is desired. In this way, the browning or crisping can be correlated with the actual dielectric heating of the fish piece.

Admirably suited for the coating material would be aluminum which can be readily evaporated onto the plastic film by conventional methods. Obviously, other materials, such as tin oxide, chromium, magnesium, silver and gold, can be used. However, aluminum is inexpensive and has been widely used in the form of aluminum foil as far as the general packaging of food is concerned.

Owing to the thinness of the material constituting the coating, it has very little thermal mass. Thicknesses of only 0.5 to $20 \times 10^{-6}$ inch can be readily realized. The thickness, of course, is correlated with the resistivity, and whatever coating material that is selected should have a thickness such as to provide a surface resistivity falling within the range hereinbefore given. Aluminum has the added capability of being readily deposited uniformly onto the plastic film in forming a satisfactory thin coating.

If desired, an additional protective sheet or film of plastic (not shown) can be laminated onto the coating, such as by adhesion. In this instance, the protective film is preferably of polyethylene, having substantially the same thickness as the polyester film.

Consequently, it will be recognized that the coated heating film 44 is not only very thin but quite flexible, as well. It should be recognized that the coating is in close proximity with the surface of the fish portions 30 and 32 that are to be browned and crisped. In this way, the heat generated by the coating is transmitted directly into the major surface 36 of the fish portions 30 and 32, imparting the desired browning and crisping thereto. Of course, when the package is subjected to microwave energy, only some of the microwave energy impinging on the package is converted into heat by the coating. The remainder of the microwave energy passes through the overcap's side surfaces 20 and 22 and end openings 26 and 28 to heat the food pieces interior.

Other materials which are well known in the art can be used in substitution for one or both of the heating layers 44 such as those materials described in U.S. Pat. No. 4,190,757 (issued Feb. 26, 1980 to C. H. Turpin) and which is incorporated herein by reference wherein a heating body is described comprising a supporting sheet to which an active microwave absorber has been applied as a relatively thin paint-like layer. The absorber can be any of four groups of materials including semiconductors, selected ferromagnetic materials, period 8 oxides and selected dielectric materials.

The mounting board 46 and the spacer member 48 are each desirably fabricated from dielectric materials with paperboard being the material of choice due to cost and familiarity. The mounting board 46 while preferred for use can be eliminated in certain embodiments of panel fabrication inasmuch as its function is to provide easier handling for the metallized film layer.

The microwave shield layer 56 is conventional in design and can be conveniently fabricated from a conductive metal foil such as aluminum which, although not critical, having a thickness of about 0.1 mils (8.9 microns) to 0.5 mils, preferably about 0.35 mils and is firmly adhered to the paperboard surface 52 using an adhesive such as a polyvinyl acetate in water emulsion.

It is important that the combined thickness of the spacer and support layer together, that is, the plate separation between the heating layer and microwave shield or the metal foil layer range from about 1 to 25.0 mm and wherein the spacer 48 in the preferred embodiment is about 1 to 8 mm. As can clearly be seen from FIG. 5, the spacer 48 is of much greater thickness than mounting board 46. The greater the plate separation, the more heat which is generated by the coating up to a limit. Clearly, insufficient plate separation can lead to insufficient browning/crisping of the coating and overheating of the fish portions interior. Excessive plate separation can undesirably lead to scorching of the mounting board 46.

The panels 40 and 42 are constructed simply by laminating or securely bonding one layer to another in appropriate sequence with adhesive means with the adhesive means (not shown) from layer to layer being either the same or different. Conventional food approved adhesives can be used.

While the panels 40 and 42 can conveniently be fabricated from low cost materials and thus find particular suitability for use as a sub-assembly in the present disposable package articles, it is to be appreciated that embodiments of the present panels can also be fabricated from more durable materials so as to realize panels which can be used repeatedly but which nonetheless are inexpensive enough to be used as giveaway premiums. As such, the panels 40 and 42 may be used in connection with food items which may have been packaged conventionally but are removed therefrom for microwave heating.

Figure 7:
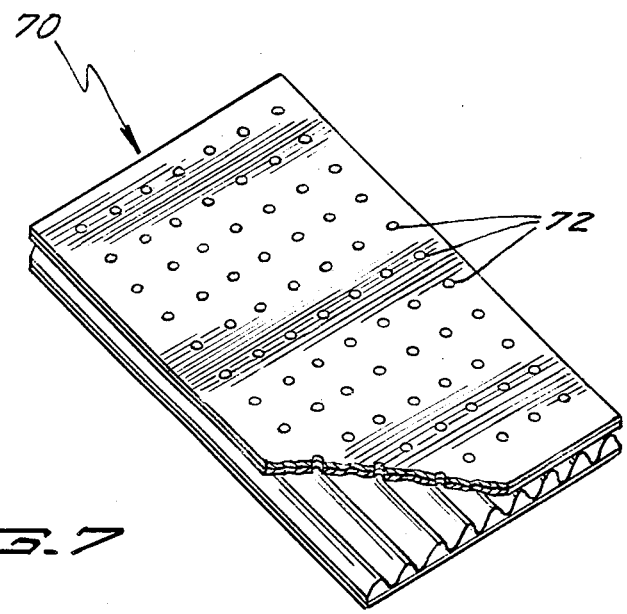
FIG. 7 is a perspective view partially cut away of an alternate embodiment of the panels shown in FIG. 6 having an array of holes.

Reference is made now to FIG. 7 which shows an embodiment of the present article having a panel 70 similar to panels 40 and 42 described but additionally having a plurality of spaced perforations or apertures 72. The perforations may be in the form of an organized array as depicted or the holes 72 may be randomly although preferably evenly distributed. The perforations 72 allow oil and/or moisture released during microwave heating to be absorbed by the panel and thus drawn away from the portions thereby further reducing the undesirable softening of the coating and oiliness of the final product. In the fabrication of these holes 72, care must be taken so as to prevent contacting of shield layer fragments with the metallized film or each other such as might occur with fabricating the holes 72 since undesirable arcing might occur.

Figure 8:
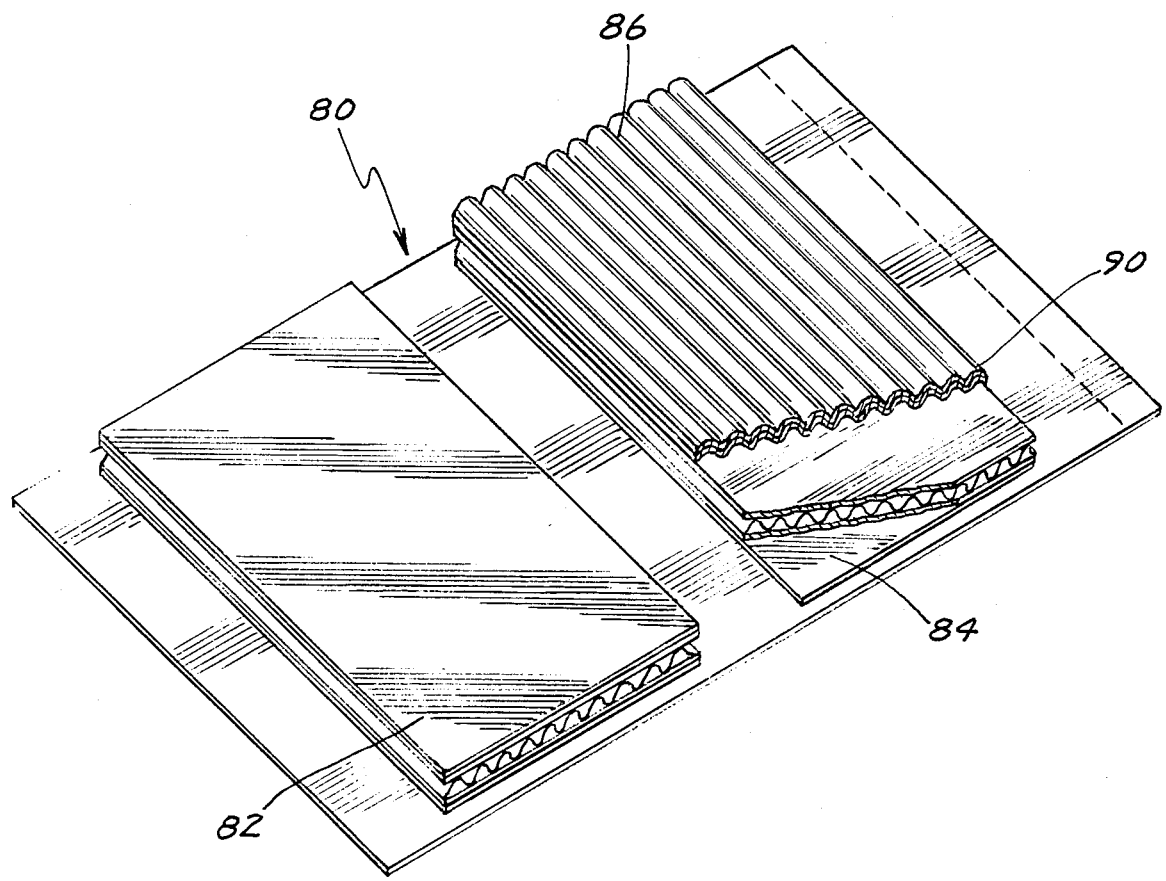
FIG. 8 is a perspective view partially cut away of another alternate embodiment of the panels shown in FIG's. 6 and 7 and characterized by a corrugated heating layer and supporting mounting board.

Reference now is made to FIG. 8 which shows an embodiment of the present package 80 having one or both panels 82 and 84 distinguished by having a heating layer 86 which is corrugated. The heating layer 86 is supported by conforming to a corrugated mounting board 90. Provision of corrugated heating layer 86 also allow for better escape of any moisture or oil which is released from a food item being heated without significant degradation of the crisping/browning function of the heating layer 86. Either the upper or lower panels alone or both may be fabricated with this corrugation feature. Also, while having the corrugation running lengthwise is preferred, panels with corrugation running along the width can also be used.

It should be understood that the foregoing description of the invention is intended merely to be illustrative thereof and that the invention is not confined to the construction and arrangements of parts herein illustrated and described, but embraces all such modified forms thereof as come within the scope of the following claims.

What is claimed is:

1. A carton useful as a component in packages for foods to be heated by microwave energy in a microwave oven, comprising:

a carton having a top major surface, a bottom major surface spaced apart and parallel to the top, a pair of spaced, parallel side elements, and a pair of spaced, opposed side openings wherein the carton is fabricated from an unshielded dielectric material;

a first heating panel mounted within the carton on the bottom major surface;

a second heating panel mounted within the carton on the top major surface, wherein each of such panels comprise:

a metallized film heating layer in sheet form having a dielectric substrate having a thin semiconducting coating thereon having the property of being able to convert a proportion of the microwave energy from the oven into heat in the coating itself;

a mounting board in sheet form having first and second major surfaces fabricated from a dielectric material upon which the heating layer is mounted on the first major surface;

a spacer in sheet form fabricated from dielectric material substantially greater than the thickness of said mounting board and having a thickness of 1 to about 8 mm mounted on the second major surface of the mounting board;

a microwave reflective shield in sheet form mounted upon the spacer spaced apart and extending parallel to the heating layer whereby the spacer is sandwiched between the microwave shield and the mounting board;

adhesive means for securing the heating layer, the mounting board, spacer and microwave shield together into a laminate; and wherein the first and second heating panels are mounted within the carton such that the microwave shield layers are adhesively secured to a major surface of the carton and wherein the heating layer and microwave shield layer are not in contact.

2. The carton of claim 1 wherein the microwave shield is a metal foil.

3. The carton of claim 2 wherein the metal foil is aluminum.

4. The carton of claim 3 wherein the coating is evaporated aluminum, and wherein the spacer comprises
   an opposed pair of spaced parallel sheets of a dielectric material and an
   intermediate corrugated dielectric material layer.

5. The carton of claim 4 wherein each dielectric material is cardboard.

6. The carton of claim 5 having a plurality of puncture holes through the heating layer and mounting board.

7. The carton of claim 6 wherein the holes are in a regular array.

8. The carton of claim 7 wherein the heating panel and mounting board are correspondingly corrugated and wherein the semiconducting coating has a specific surface resistance of from about 1 to 300 ohms per square inch.

9. A packaged food item intended to be heated by microwave heating, comprising:
   a carton having a top major surface, a bottom major surface spaced apart and parallel to the top, a pair of spaced, parallel side elements, and a pair of spaced, opposed side openings wherein the carton is fabricated from an unshielded dielectric material;
   a first heating panel mounted within the carton on the bottom major surface;
   a second heating panel mounted within the carton on the top major surface, wherein each of such panels comprise:
   a metallized film heating layer in sheet form having a dielectric substrate having a thin semiconducting coating thereon having the property of being able to convert a proportion of the microwave energy from the oven into heat in the coating itself;
   a mounting board in sheet form having first and second major surfaces fabricated from a dielectric material upon which the heating layer is mounted on the first major surface;
   a spacer in sheet form fabricated from dielectric material substantially greater than the thickness of said mounting board and having a thickness of 1 to about 8 mm mounted on the second major surface of the mounting board;
   a microwave reflective shield in sheet form mounted upon the spacer spaced apart and extending parallel to the heating layer whereby the spacer is sandwiched between the microwave shield and the mounting board;
   adhesive means for securing the heating layer, mounting board, spacer and microwave shield together into a laminate;
   wherein the first and second heating panels are mounted within the carton such that the microwave shield layers are adhesively secured to a major surface of the carton thereby defining an internal cavity;
   a food piece positioned within the carton in the internal cavity; and
   wherein the heating layers are in intimate physical contact with the food piece and wherein the heating layer and microwave shield layer are not in contact.

10. The packaged food item of claim 9 additionally comprising a plurality of food pieces wherein the microwave shield is a metal foil.

11. The packaged food item of claim 10 wherein the metal foil is aluminum.

12. The packaged food item of claim 11 wherein the coating is evaporated aluminum, and wherein the spacer comprises
   an opposed pair of spaced parallel sheets of a dielectric material and
   an intermediate corrugated dielectric material layer.

13. The packaged food item of claim 12 wherein each dielectric material is cardboard.

14. The packaged food item of claim 13 having a plurality of puncture holes through the heating layer and mounting board.

15. The packaged food item of claim 14 wherein the holes are in a regular array.

16. The packaged food item of claim 15 wherein the heating panel and mounting board are correspondingly corrugated
   wherein the food item additionally comprises an overwrap, and
   wherein the semiconducting coating has a specific surface resistance of from about 1 to 300 ohms per square inch.

* * * * *